US 8,270,507 B2

(12) United States Patent
Schneider et al.

(10) Patent No.: US 8,270,507 B2
(45) Date of Patent: Sep. 18, 2012

(54) OPTIMUM BER ADJUSTMENT FOR ADAPTIVE MULTI-CARRIER MODULATION

(75) Inventors: Daniel Schneider, Stuttgart (DE); Lothar Stadelmeier, Stuttgart (DE)

(73) Assignee: Sony Corporation, Tokyo (JP)

( * ) Notice: Subject to any disclaimer, the term of this patent is extended or adjusted under 35 U.S.C. 154(b) by 821 days.

(21) Appl. No.: 12/272,291

(22) Filed: Nov. 17, 2008

(65) Prior Publication Data

US 2009/0161780 A1 Jun. 25, 2009

(30) Foreign Application Priority Data

Dec. 19, 2007 (EP) .................................. 07123637

(51) Int. Cl.
*H04K 1/10* (2006.01)
(52) U.S. Cl. ........................................ 375/260; 370/252
(58) Field of Classification Search .................. 370/252, 370/344; 375/260
See application file for complete search history.

(56) References Cited

U.S. PATENT DOCUMENTS

| | | | | |
|---|---|---|---|---|
| 5,357,249 A | * | 10/1994 | Azaren et al. | 341/100 |
| 6,452,964 B1 | * | 9/2002 | Yoshida | 375/222 |
| 2006/0034244 A1 | | 2/2006 | Huang et al. | |
| 2007/0140102 A1 | * | 6/2007 | Oh et al. | 370/208 |
| 2008/0175163 A1 | * | 7/2008 | Honary et al. | 370/252 |

FOREIGN PATENT DOCUMENTS

| | | |
|---|---|---|
| EP | 1653646 A1 * | 3/2005 |
| EP | 1 653 646 A1 | 5/2006 |
| WO | WO 2006/118892 A1 | 11/2006 |

OTHER PUBLICATIONS

Office Action issued Apr. 28, 2011, in Chinese Patent Application No. 200810188671.X (English translation only).
U.S. Appl. No. 12/545,205, filed Aug. 21, 2009, Stadelmeier, et al.
Office Action issued Dec. 2, 2011 in Chinese Application No. 200810188671.X (With English Translation).

* cited by examiner

*Primary Examiner* — Leon-Viet Nguyen
(74) *Attorney, Agent, or Firm* — Oblon, Spivak, McClelland, Maier & Neustadt, L.L.P.

(57) ABSTRACT

The present invention relates to the fields of adaptive multi-carrier data transmission schemes. The present invention especially relates to a method of adapting transmission parameters of a group of subcarriers, a software program product and a communication device. The method of adapting transmission parameters of a group of subcarriers comprises steps of: determining a channel quality value for each subcarrier; establishing an order of assignment groups, each assignment group comprising one or more subcarriers, based on the channel quality values; assigning, in the order of the assignment groups, a transmission parameter to every assignment group, whereby assigning a transmission parameter to an assignment group comprises assigning the transmission parameter to all subcarriers of the assignment group; and calculating a link performance value based on previously assigned one or more transmission parameters; whereby the step of assigning a transmission parameter to every assignment group is based on the calculated link performance value.

23 Claims, 4 Drawing Sheets

OPTIMUM BER ADJUSTMENT FOR ADAPTIVE MULTI-CARRIER MODULATION

FIELD OF THE PRESENT INVENTION

The present invention relates to the fields of adaptive multi-carrier data transmission schemes. The present invention especially relates to a method of adapting transmission parameters of a group of subcarriers, a software program product and a communication device.

BRIEF DESCRIPTION OF THE PRIOR ART

Multi-carrier systems (e.g. Orthogonal Frequency Division Multiplex (OFDM) and multi-carrier wavelet modulation) are typically used when the transmission channel is faced to strong multipath effects, which results in strong variation of the channel transfer function. In multi-carrier systems, the frequency range used for transmission is divided into a plurality of smaller frequency ranges, each of the smaller frequency ranges being associated with a subcarrier. In adaptive multi-carrier systems each subcarrier adapts its modulation according to given conditions (e.g. depending on the channel characteristics or the presence of other services). Typically, a channel estimation on the receiver side provides a signal-to-noise ratio (SNR) for each of the OFDM subcarriers. This SNR is compared to thresholds in order to assign the "best" modulation scheme. Subcarriers with a low SNR are assigned a robust modulation scheme with a low modulation order (e.g. BPSK or QPSK). For a subcarrier with a higher SNR, a modulation scheme with a higher modulation order is assigned. Subcarriers with insufficient (i.e. very low) SNR are notched (not used to transmit data). At least for OFDM, the modulation schemes used typically all are of the Quadrature Amplitude Modulation (QAM) type and the difference between the different modulation schemes assigned resides in the use of different constellations. Adaption of the subcarrier modulation strongly increases the overall throughput in comparison to non-adaptive multi-carrier systems.

A Bit Error Rate is abbreviated by BER. An overall BER is a BER provided by a group of subcarriers, e.g. all subcarriers of a multi-carrier communication device. The overall BER is the average of the BERs delivered by each of the subcarriers. Two basic schemes to achieve a desired overall BER value (target BER) are known in the art. In a simple solution, there is a dedicated SNR range for each one of the modulation schemes. The association of a SNR range with a modulation scheme is schematically depicted in FIG. 1. An estimated SNR value of a subcarrier is then directly mapped to the corresponding modulation scheme. Using this simple solution, the target BER is guaranteed (not to be surpassed), but the achieved overall BER value may be far from the target BER. In a technically more complex solution, an averaging over several or all subcarriers is carried out. Hereby, some subcarriers deliver a slightly increased bit error rate (BER) with respect to the target BER, while other subcarriers remain below the target BER, the overall BER, however, is close to the target value. Interleaving is applied to provide for a homogeneous BER. Averaging results in better SNR thresholds which implies an increased throughput (data rate). However, even using this improved solution, the target BER is not achieved with desired precision.

Thus, the problem to be solved by the present invention is to provide an improved method of assigning transmission parameters (e.g. a modulation scheme) to a group of subcarriers so that a link performance value (e.g. a BER) can be achieved with high accuracy and to provide for a corresponding software program product and a corresponding communication device.

BRIEF DESCRIPTION OF THE PRESENT INVENTION

This problem is solved by a method of adapting transmission parameters of a group of subcarriers comprising steps of determining a channel quality value for each subcarrier; establishing an order of assignment groups, each assignment group comprising one or more subcarriers, based on the channel quality values; assigning, in the order of the assignment groups, a transmission parameter to every assignment group, whereby assigning a transmission parameter to an assignment group comprises assigning the transmission parameter to all subcarriers of the assignment group; and calculating a link performance value based on previously assigned one or more transmission parameters; whereby the step of assigning a transmission parameter to every assignment group is based on the calculated link performance value.

Advantageously, said step of calculating the link performance value is executed once between every two consecutive assignments of a transmission parameter to an assignment group.

Advantageously, in case the calculated link performance value is above a link performance target value, the assignment group which is to be assigned next is assigned a transmission parameter which effects a lower link performance value than the transmission parameter assigned to the assignment group which has been assigned before.

Advantageously, in case the calculated link performance value is above the link performance target value, the assignment group which has been assigned before is reassigned a transmission parameter, the reassigned transmission parameter being the transmission parameter assigned to the assignment group which is assigned next.

Advantageously, the assigned transmission parameters are elements of a predefined ordered set, whereby a transmission parameter causing a higher link performance value is ordered before a transmission parameter causing a lower link performance value, and the transmission parameter which is assigned to the assignment group which is to be assigned next is the transmission parameter which is the next in order from the transmission parameter which has been assigned before.

Advantageously, in case the calculated link performance value is below the link performance target value, the assignment group which is assigned next is assigned the same transmission parameter as the transmission parameter which has been assigned before.

Advantageously, the step of calculating a link performance value based on previously assigned one or more transmission parameters comprises steps of calculating a subcarrier specific link performance value for each of the one or more previously assigned transmission parameters; and averaging the calculated subcarrier specific link performance values to obtain the link performance value. Calculating a subcarrier specific link performance value for each of the one or more previously assigned transmission parameters means calculating a subcarrier specific link performance value for each of the corresponding one or more subcarriers based on the transmission parameter assigned to the subcarrier.

Advantageously, said one or more subcarriers are all subcarriers having previously assigned a transmission parameter or are all subcarriers having lastly been assigned the same transmission parameter.

The channel quality values advantageously correspond to, are or are based on signal-to-noise ratios.

The transmission parameters advantageously are modulation orders or modulation schemes.

The link performance value advantageously corresponds to, is or is based on a bit error rate.

The problem is further solved by a software program product, which when executed by one or more processing devices is adapted to carry out the method of adapting transmission parameters of a group of subcarriers according to the present invention.

The problem is further solved by a communication device comprising a channel estimator for determining a channel quality value for each subcarrier of a group of subcarriers; and a controller. The controller is adapted to establish an order of assignment groups, each assignment group comprising one or more subcarriers, based on the channel quality values; assign, in the order of the assignment groups, a transmission parameter to every assignment group, whereby assigning a transmission parameter to an assignment group comprises assigning the transmission parameter to each subcarrier of the assignment group; and calculate a link performance value based on previously assigned one or more transmission parameter; whereby said assignment of a transmission parameter to every assignment group is based on the calculated link performance value.

Advantageously, the controller is adapted to calculate said link performance value between every two consecutive assignments of a transmission parameter to a transmission group.

Advantageously, in case the calculated link performance value is above a link performance target value, the assignment group which is to be assigned next is assigned a transmission parameter which effects a lower link performance value than the transmission parameter assigned to the assignment group which has been assigned before.

Advantageously, in case the calculated link performance value is above the link performance target value, the controller is adapted to reassign a transmission parameter to the assignment group which has been assigned before, the reassigned transmission parameter being the transmission parameter assigned to the assignment group which is assigned next.

Advantageously, the assigned transmission parameters are elements of a predefined ordered set, whereby a transmission parameter causing a higher link performance value is ordered before a transmission parameter causing a lower link performance value, and the transmission parameter which is assigned to the assignment group which is to be assigned next is the transmission parameter which is the next in order from the transmission parameter which has been assigned before.

Advantageously, in case the calculated link performance value is below the link performance target value, the controller is adapted to assign to the assignment group which is assigned next the same transmission parameter as the transmission parameter which has been assigned before.

Advantageously, the controller is adapted to calculate said link performance value by calculating a subcarrier specific link performance value for each of the one or more previously assigned transmission parameters; and averaging the calculated subcarrier specific link performance values to obtain the link performance value.

Advantageously, said one or more subcarriers are all subcarriers having previously assigned a transmission parameter or are all subcarriers having lastly been assigned the same transmission parameter.

The channel quality values advantageously correspond to, are or are based on signal-to-noise ratios.

The transmission parameters advantageously are modulation orders or modulation schemes.

The link performance value advantageously corresponds to, is or is based on a bit error rate.

DESCRIPTION OF PREFERRED
EMBODIMENTS OF THE PRESENT
INVENTION

A transmission parameter describes the scheme used for transmission (transmission scheme). For example, a modulation scheme used for transmission is a transmission parameter. A transmission parameter can be adjusted at will (within the technical limits provided by a given communication system). A transmission parameter is adapted according to channel conditions (e.g. SNR). Therefore, the channel conditions have an influence on the transmission parameter. Because the influence is via an adaption mechanism, it may be called indirect. In the present invention, a transmission parameter describes the scheme that is used for transmission on a given subcarrier. The transmission parameter might indicate that the subcarrier is not used for data transmission at all.

A link performance value describes a property of a communication link that is provided based on the transmission scheme described (at least in part) by a transmission parameter. An example of a link performance value is a BER. Channel conditions do have direct impact on the link performance value. A link performance value can be adjusted only indirectly, by adjusting one or more transmission parameters.

Figure 1:
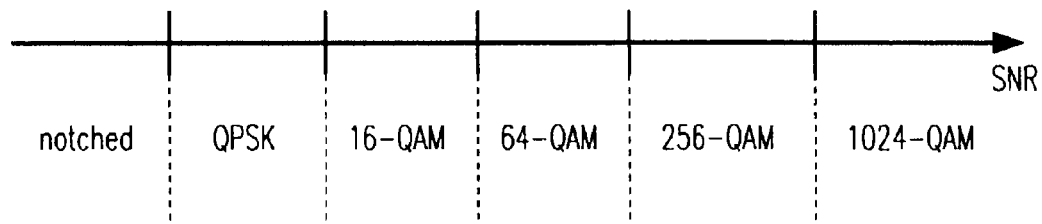
FIG. 1 shows the association (mapping) of a SNR to a modulation scheme according to the prior art.
Figure 2:
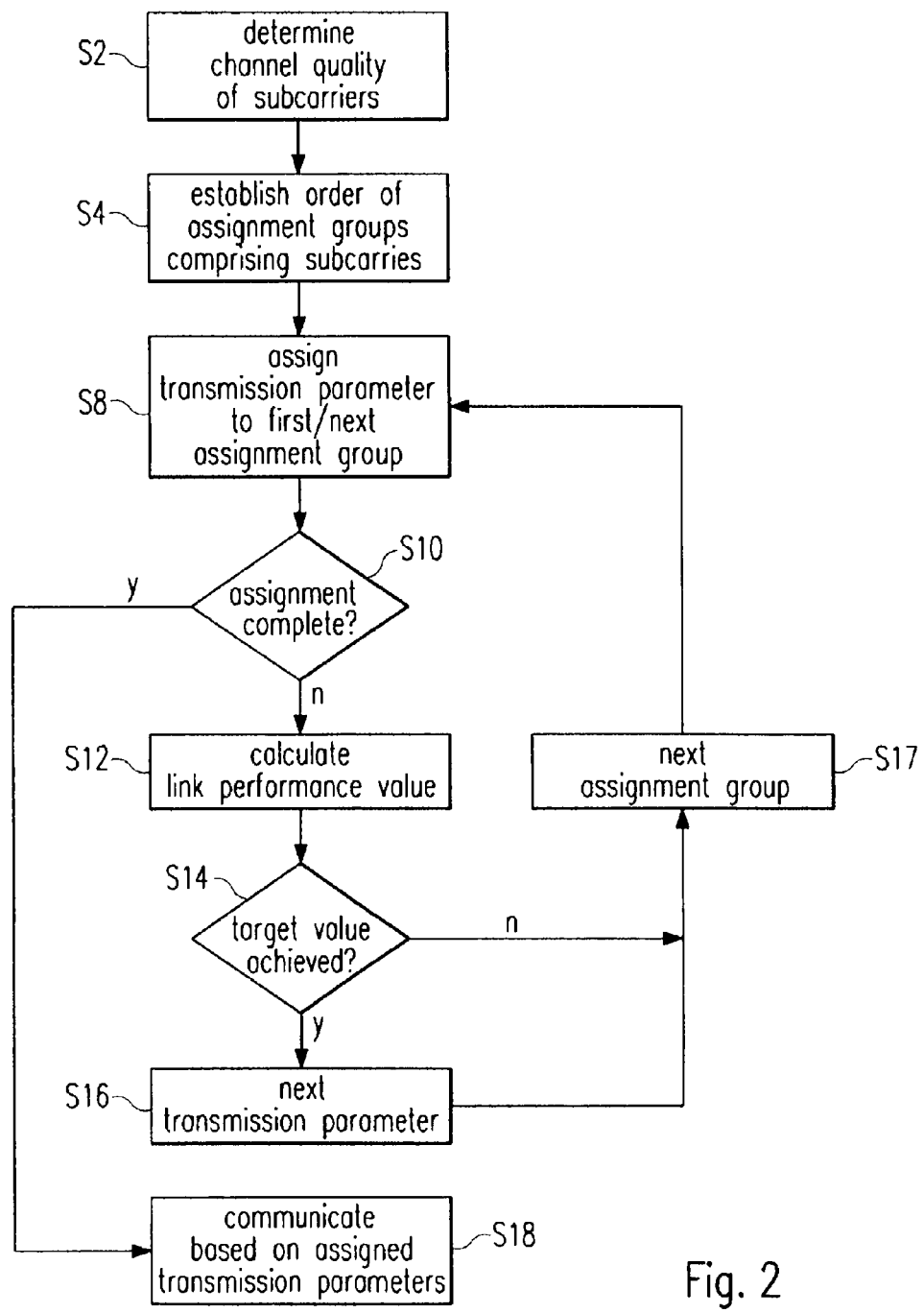
FIG. 2 shows a first embodiment of the method of adapting transmission parameters of a group of subcarriers according to the present invention.

FIG. 2 shows a first embodiment of the method of adapting transmission parameters of a group of subcarriers according to the present invention. The group of subcarriers may, for example, be given by all subcarriers of a multi-carrier communication device, e.g. an OFDM communication device transmitting and/or receiving data on OFDM subcarriers. In the following, all subcarriers/each subcarrier refers to all subcarriers/each subcarrier of the group of subcarriers unless otherwise noted.

In a step S2, a channel quality value is determined for each subcarrier of the group of subcarriers. A channel quality value might be determined for each channel quality value separately or a common channel quality value may be determined for a group of subcarriers (e.g. a group of subcarriers of neighboring frequency). Thereafter, the method proceeds to step S4.

In step S4 an order of assignment groups is established based on the determined channel quality values. The assignment groups are constituted in the following way. Each assignment group comprises one or more subcarriers. Every subcarrier of the group of subcarriers is in exactly one assignment group. For any two assignment groups any subcarrier of one of the two assignment groups is larger or equal than any subcarrier of the other of the two assignment groups. Therefore, the channel quality indices of the subcarriers induce an order of the assignment groups and the assignment groups can be ordered according to the channel quality values.

For each assignment group one representative (i.e. subcarrier) may be selected. The order of the assignment group is given by the order of the representatives of the assignment groups. An example of assignment groups is given in the following. For example, if c1 to c10 are subcarriers and the subcarriers are ordered according to c2, c4, c3, c1, c5, c6, c8, c7, whereby c2 is ordered first. The groups may then be formed and ordered according to (c2, c4), (c3), (c1, c5), (c6, c8, c7), whereby subcarriers in parentheses form a group and the group (c2, c4) is ordered first. Grouping may, for example, be applied in order to reduce calculation complexity and/or when a common channel quality value is determined for a group of subcarriers. However, even when a common channel quality value is determined, grouping need not be used. Grouping may be trivial. The trivial grouping for the above example is (c2), (c4), (c3), (c1), (c5), (c6), (c8), (c7). In a trivial grouping, each assignment group comprises exactly one subcarrier. In this case, the assignment groups and subcarriers can be considered the same. After ordering the assignment groups according to the channel quality values, the method proceeds to step S8.

In step S8, a current assignment group is assigned a transmission parameter. Assigning a transmission parameter to an assignment group comprises assigning the transmission parameter to all subcarriers of the assignment group. In this embodiment, the transmission parameters are ordered too. When entering step S8 from step S4, the current assignment group is the assignment group ordered first (i.e. (c2, c4) in the above example) and the assigned transmission parameter is the transmission parameter which is ordered first. When entering step S8 from step S17, the current assignment group is the assignment group next from the assignment group having assigned a transmission parameter before (e.g. when (c1, c5) has been assigned before, the current assignment group is (c6, c8, c7)). Assigning a transmission parameter to an assignment group may comprise assigning a special transmission parameter (value) indicating that the subcarriers of the assignment group are notched (i.e. not used for transmitting data). After step S8, the method proceeds to step S10.

In step S10, it is determined if all subcarriers have been assigned a transmission parameter. If yes, the method proceeds to step S18. If no, the method proceeds to step S12 in order to assign a transmission parameter to the next assignment group.

In step S12, a link performance value is calculated (i.e. estimated) based on previously assigned transmission parameters. The link performance value may, for example, be an average of link performance values of some or of all of the previously subcarriers. Thereafter the method proceeds to a step S14.

In step S14, the calculated link performance value is compared with a link performance target value and it is decided if the link performance target value has been achieved. If no, the method proceeds to a step S17. If yes, the method proceeds to a step S16.

In step S16, the next transmission parameter is selected and the method proceeds to a step S17.

In step S17, the next assignment group is set as the current assignment group and the method returns to step S8.

By deciding if a link performance target value has been reached or not in step S14 and assigning in dependency thereof a transmission parameter to the next assignment group, the link performance value can be adjusted to the link performance target value.

In step S18, a multi-carrier communication link (e.g. OFDM communication link) is operated based on the transmission parameters assigned to the subcarriers. Hereby, the subcarriers are configured with the respectively assigned transmission parameters and the communication link is operated employing the configured subcarriers. When a subcarrier is assigned the special transmission parameter indicating that the subcarrier is notched, the subcarrier is not used for transmitting data.

In the above method, the step S8 is repeated until all assignment groups have been assigned a transmission parameter. Therefore, every assignment group is assigned a transmission parameter. Moreover, the assignment is in the order of the assignment groups and the assignment is based on the link performance target value and the link performance value calculated in step S12.

Figure 3:
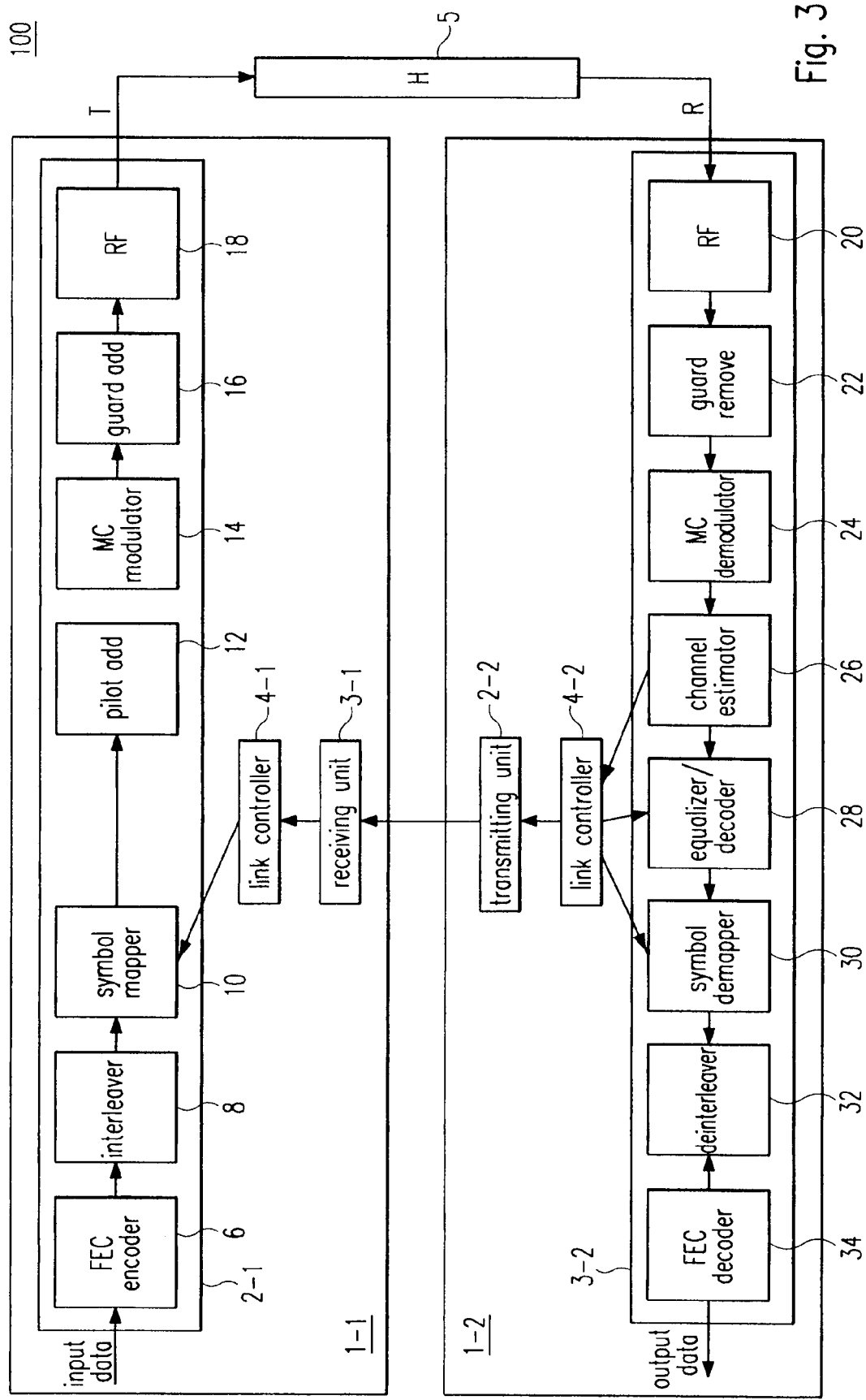
FIG. 3 shows an embodiment of the communication device according to the present invention.

FIG. 3 shows a communication system 100 comprising two communication devices 1-1, 1-2 according to an embodiment of the present invention. The communication device 1-1 comprises a transmitting unit 2-1, a receiving unit 3-1 and a link controller 4-1. The communication device 1-2 comprises a transmitting unit 2-2, a receiving unit 3-2, and a link controller 4-2. The communication devices 1-1 and 1-2 are identical. The communication devices 1-1, 1-2 may both operate as receiver and as transmitter. In the situation depicted in FIG. 3, the device 1-1 is in the role of the transmitter which transmits information (including user data) via the communication channel 5 to the communication device 1-2 which is in the role of the receiver. Because the devices 1-1 and 1-2 are the same, they comprise the same subunits (i.e. the transmitting units 2-1 and 2-2 are identical, the receiving units 3-1 and 3-2 are identical and the link controllers 4-1 and 4-2 are identical). Especially, the receiving unit 3-1 comprises the same subunits as are shown for the receiving unit 3-2 and the transmitting unit 2-2 comprises the same subunits as are shown for the transmitting unit 2-1. All operations the communication device 1-1 is adapted to perform, the communication device 1-2 is also adapted to perform and vice versa. Never the less, the communication device 1-2 according to the present invention may, be adapted to operate in the receiver mode only and comprise only the subunits required for operating in the receiver mode. When not referring to a special one of the communication devices 1-1 and 1-2 or to a subunit of the devices 1-1 and 1-2, the suffix "-2" and "-1" used to differentiate between the receiver and the transmitter may be dropped in the following.

The communication device 1 may be any kind of communication device. It may be a wired (e.g. a Power Line Communication modem) or a wireless (e.g. an RF wireless) communication device. It may be a stationary (e.g. a WLAN base station, DSL modem) or a non-stationary (i.e. portable) (e.g. a mobile phone) communication device. The communication system 100 depicted in FIG. 3 and described in the following is a single-input-single-output (SISO) communication system. However, a multiple-input-multiple-output (MIMO) system is generally possible too.

Now, transmission of data (including user data) from the transmitter 1-1 to the receiver 1-2 is explained.

Before describing in detail the inventive features of the transceiver 1, first a description of the general operation of the multi-carrier transceiver 1 (e.g. OFDM transceiver 1) is given.

In the schematic block diagram of FIG. 3 the transmitting unit 2-1 is seen to comprise in the order of signal processing: A forward error correction (FEC) encoder 6, an interleaver 8, a symbol mapper 10, a pilot adder 12, a multi-carrier (MC) modulator 14, a guard interval adder 16 and an RF unit 18.

Input data (user data bits or control data bits) are provided to the FEC encoder 6. The encoder 6 encodes the input data according to a coding method such as an error correction code.

The interleaver 8 interleaves the encoded input data bits according to an interleaving method.

The symbol mapper 10 maps the interleaved input data bits to symbols according to constellation information (assignment information) provided by the link controller 4-1. This operation of the symbol mapper 10 is also known as modulation (e.g. QAM modulation). Thus, the symbol mapper 10 (e.g. an adaptive QAM modulator) modulates the interleaved input data bits according to a modulation method specified by the constellation information provided by the link controller 4-1. The link controller 4-1 receives the constellation information from the receiver 1-2 via the receiving unit 3-1.

The pilot adder 12 inserts pilot symbols into the symbols received from the symbol mapper 10. As known in the art, pilot symbols are used for channel estimation purposes.

The MC modulator 14 performs a multi-carrier modulation on the signal received from the pilot adder 12. In case of the OFDM for example, the MC modulator 14 may be an inverse fast Fourier transformator (IFFT) 14 performing an inverse fast Fourier transformation on the signal received from the pilot adder 12. The guard interval adder 16 inserts a guard interval (cyclic prefix or cyclic post fix) to provide immunity against propagation delays of different length as is known in the art. The RF unit 18 is an electronic circuit for processing (up-converting) the signal so that it can be transmitted on the transmit path T.

The signal is transmitted via a communication path (communication channel) 5 to the receiver 1-2.

The receiving unit 3-2 comprises in signal processing order an RF unit 20, a guard interval remover 22, a multi-carrier (MC) demodulator 24, a channel estimator 26, an equalizer/decoder 28, a symbol demapper 30, a deinterleaver 32 and a FEC decoder 34. The equalizer/decoder 28 is referred to by "equalizer" and by "decoder" in the art of multi-carrier transceivers.

The RF unit 20 is an electronic circuit which down-converts a signal received on the receive path R.

The guard interval remover 22 removes the guard intervals from the received signals.

The MC demodulator 24 performs a multi-carrier demodulation corresponding to the multi-carrier modulation of the MC modulator 14 on the received signal. In case of OFDM for example, the MC demodulator 24 may be a fast Fourier transformator 14 performing a fast Fourier transformation on the received signal.

The channel estimator 26 estimates the channel characteristics (including determination of channel state information) of the transmission channel 5 based on the received signal (e.g. based on the pilot symbols, based on training bursts) and removes the pilot symbols from the received signal.

The equalizer/decoder 28 equalizes/decodes (at least part of) the received signal based on the channel estimation information provided via the link controller 4-2 by the channel estimator 26.

The symbol demapper 30 (e.g. an adaptive QAM demodulator) demaps the symbols comprised in the signal received from the equalizer/decoder 28 to bits based on constellation information (assignment information) provided by the link controller 4-2, whereby the constellation information corresponds to the constellation information used in the transmitter 1-1 (the symbol mapper 10). In other words, the symbol demapper 30 demodulates the signal with a demodulation method corresponding to the modulation method used in the transmitter 1-1 (the symbol mapper 10).

The deinterleaver 32 deinterleaves the bits received from the symbol demapper 30 in a deinterleaving method corresponding to the interleaving method used in the transmitter 1-1 (the interleaver 8).

The FEC decoder 34 decodes the deinterleaved bits in a decoding method corresponding to the coding method used in the transmitter 1-1 (the encoder 6) and outputs the received data. When the transmission was successful, the output data is the same as the input data.

The transmitting unit 2-1 and the receiving unit 3-2 may comprise other units not shown, may not comprise a unit shown and may have replaced a unit shown by another unit and may have the order of units shown reversed. For example, the RF units 18, 20 are not required for a base band transmission or may be replaced with other appropriate units when utilizing another transmission media than radio frequency electromagnetic waves. For example, the order of the encoder 6 and the interleaver 8 and the order of the deinterleaver 32 and the decoder 34 may be reversed. For example, serial-to-parallel converters, parallel-to-serial converters, digital-to-analog converters and analog-to-digital converters, of which the use is well known in the art of OFDM transceivers, are not shown.

Data transmission on the feedback channel from the receiver 1-2 to the transmitter 1-1 via the transmitting unit 2-2 and the receiving unit 3-1 may, but need not, be achieved in the same way as the described data transmission from the transmitter 1-1 to the receiver 1-2.

Having described the general operation of the communication device 1, now a description of the inventive mode of transmission parameter assignment is given.

In the embodiment, it is assumed that the transmission parameter adapted is the modulation scheme of a subcarrier, the different modulation schemes differ by their constellation and the constellations are ordered according to their constellation size, the link performance value is a BER and the channel quality value is a SNR. (Modulation order is another name for constellation size. Therefore, the modulation schemes are ordered according to their modulation orders.)

First, the receiver 1-2 is described.

The channel estimator 26 is configured to determine the channel quality value (SNR) for each of the subcarriers based on received signals and to provide this information to the link controller 4-2.

The link controller 4-2 performs the assignment of the transmission parameter (constellation) to each of the subcarriers (i.e. carries out the above method steps S4 to S17). Hereby, the link controller 4-2 obtains assignment information which describes which subcarrier is assigned which transmission parameter (constellation). The link controller 4-2 controls the symbol demapper 30 so as to enforce the first assignment information (local enforcement). The link controller 4-2 also causes the assignment information to be transmitted to the transmitter 1-2 via the transmitting unit 2-2 in order to provide for remote enforcement of the assignment information.

Now, the transmitter 1-2 described.

The link controller 4-1 is configured to receive the assignment information from the receiver 1-2 via the receiving unit 3-1. The link controller 4-1 controls the symbol mapper 10 so as to enforce the second assignment information. Thus, the same transmission parameters are used in the receiver 1-2 and the transmitter 1-1.

Figure 4:
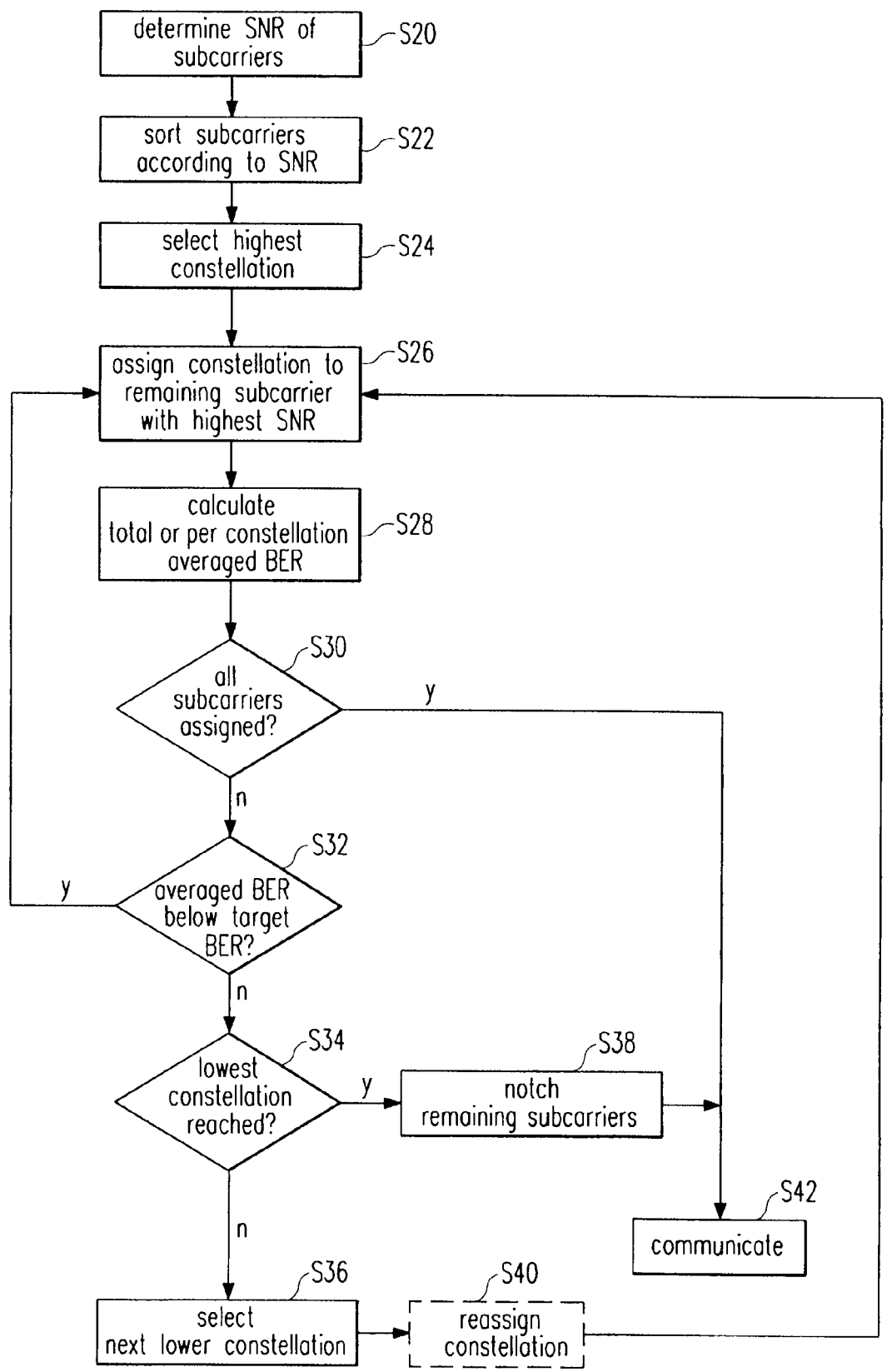
FIG. 4 shows further embodiments of the method of adapting transmission parameters of a group of subcarriers according to the present invention.

Now, an embodiment of the method of adapting transmission parameters according to the present invention is described with reference to FIG. 4. The method is executed by the receiver 1-2. The embodiment of the method of adapting transmission parameters comprises steps S20 to S40 described below. A method additionally comprising a step S42 described below is a method of communication. If not stated otherwise, the method steps are executed by the link controller 4-2.

In a step S20, the SNR (channel quality value) is determined for each subcarrier of a group of subcarriers (e.g. OFDM subcarriers) by the channel estimator 26. Thereafter, the method proceeds to step S22.

In step S22, the subcarriers are sorted (ordered) according to the respective SNR. Thus, an order of the subcarriers is established. In this embodiment, the grouping of subcarriers into assignment group is trivial (i.e. each subcarrier corresponds to one assignment group). The method proceeds to a step S24.

In step S24, the constellation of the highest order is selected as a current constellation. Thereafter the method proceeds to a step S26.

In step S26, the current constellation is assigned to the remaining (i.e. the previously unassigned) subcarrier with the highest SNR. Thereafter the method proceeds to a step S28.

In step S28, an average BER is calculated. The average BER is the average BER of one or more subcarriers which have already been assigned a constellation. Therefore, calculation of the average BER is based on one or more of the (previously) assigned constellations (i.e. transmission parameters). This step comprises calculating the BER of the individual subcarriers. State of the art techniques may be employed for this. For example, the BER can be determined by a table lookup according to the known BER performance of each constellation. That is, the SNR to BER curve (waterfall curve) is known and is provided as a lookup table for each modulation/constellation. Alternatively, the BER can be determined based on approximation formulas of the SNR to BER curves (waterfall curves).

In a first of two mutually alternative embodiments, the calculated average BER is an average BER of all previously assigned subcarriers. In this case, the average BER may, but need not, be a weighted mean weighted by the constellation size (modulation order). In the second of the two mutually alternative embodiments, the calculated average BER is an average BER of only those subcarriers having previously assigned the same constellation as the current subcarrier. In this case, the average BER may, but need not, be an arithmetic mean. After step S28, the method proceeds to a step S30.

In step S30, it is determined whether all subcarriers have been assigned a constellation. In case yes, the method proceeds to a step S42. In case no, the method proceeds to a step S32.

In step S32, it is determined, if the calculated average BER is below the target BER. If yes, the method returns to step S26. If no, the method proceeds to a step S34.

In step S34, it is determined, if the lowest constellation (i.e. the constellation with the smallest constellation order) has been reached. (The lowest constellation has been reached, when in step S36 the lowest constellation has been selected as the current constellation). If no, the method proceeds to a step S36, where the next lower constellation (i.e. the constellation with the next lower constellation size) is selected as the current constellation and further returns to step S26. If yes, a special transmission parameter, indicating that the remaining subcarriers (i.e. the previously unassigned subcarriers) are notched is assigned to the remaining subcarriers in a step S38 and the method further proceeds to a step S42.

Step S40 is optional and is described below.

In step S42, a multi-carrier communication link is operated based on the constellations assigned to the subcarriers. Hereby, the symbol demapper 30 is configured with the assigned constellations and demaps symbols carried by a given subcarrier based on the constellation assigned to the subcarrier. When a subcarrier is assigned the special transmission parameter indicating that the subcarrier is notched, the subcarrier is not used for transmitting data. Of course, before the multi-carrier communication link can be operated based on the assigned transmission parameters, the assignment information (constellation information) must be transmitted to the transmitter 1-2, so that it can be enforced remotely (each subcarrier is modulated according to the assigned constellation) as described above.

Figure 5:
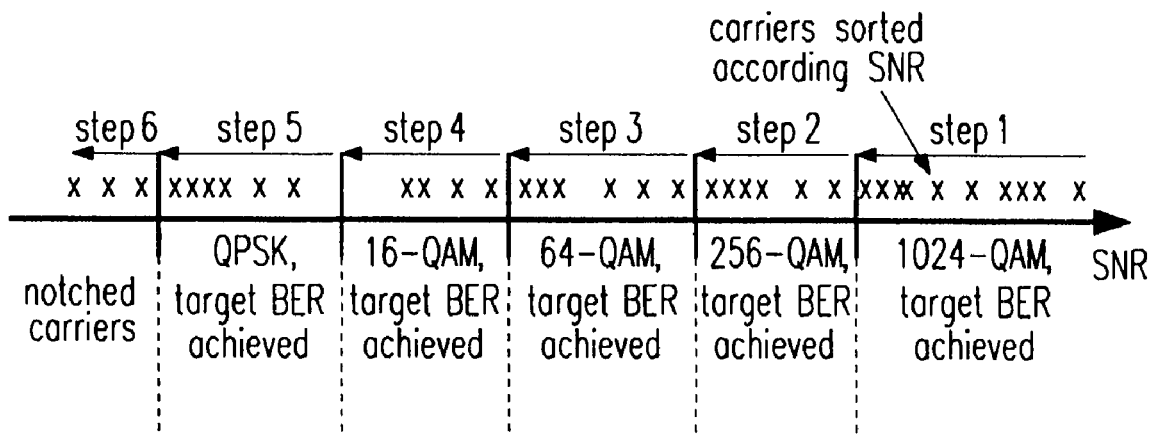
FIG. 5 shows an example of the assignment of transmission parameters according to the further embodiments of the method of adapting transmission parameters.

FIG. 5 illustrates the above processing. For the purpose of illustration only, the available modulation schemes are given by 1024-QAM, 256-QAM, 64-QAM, 16-QAM and QPSK in this order. The skilled person may choose other modulation schemes according to circumstances.

In a first step, the subcarriers having the highest SNR are assigned the highest order modulation (1024-QAM) until the target BER is achieved. Then, in a second step, the remaining subcarriers with highest SNR are assigned the next lower constellation (256-QAM) until the target BER is achieved. The second step is "repeated" (with 64-QAM, 16-QAM and QPSK) until in a fifth step, during assignment of the lowest order constellation (i.e. QPSK), the target BER is achieved. The remaining subcarriers correspond to notched carriers which are assigned the notched status in a sixth step. It is to be noted that, the group of subcarriers which are assigned a same constellation in one of the first to fifth steps does not correspond to an assignment group (it may happen by chance that the group of subcarriers which are assigned a same constellation in one of the first to fifth steps comprises exactly one assignment group, but, generally, it may comprise more than one assignment group).

Figure 6:
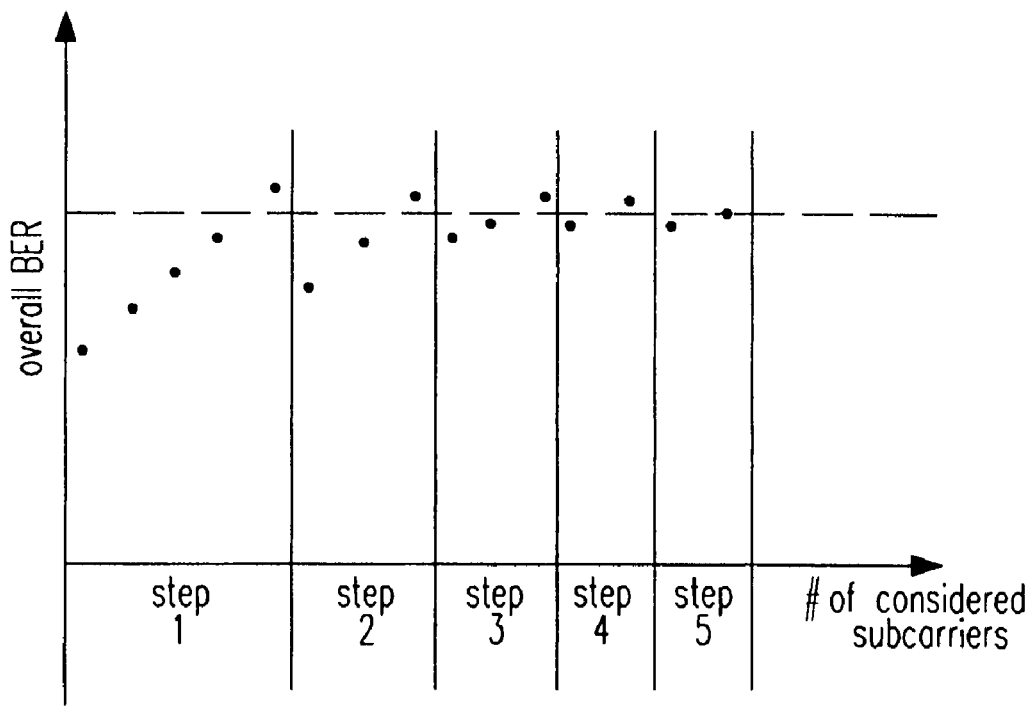
FIG. 6 shows an example of the overall BER achieved during assignment of the transmission parameters according to the further embodiments of the method of adapting transmission parameters.

FIG. 6 further illustrates the above processing in a typical example. First the case of the first of the two mutually exclusive embodiments is considered. FIG. 6 shows the overall number of considered (i.e. previously assigned) subcarriers versus the (calculated) overall BER. The dashed line corresponds to the target BER. Within each step, the overall BER increases (at least does not decrease) with the number of considered subcarriers until the target BER is reached. Deviation from the target BER gets smaller from step to step. It can be seen that the target BER may be surpassed by the overall BER (for example in case the fifth step would not be executed). This, however, is no problem since normally the number of subcarriers is very large (currently there are systems using more than one thousand subcarriers) and, therefore, the deviation from the target BER is small. PLC communication systems, for example, typically have a high number of small bandwidth (about 20 kHz) subcarriers. Additionally, it must be taken into account that estimation of the overall BER is not exact (i.e. the calculated value will deviate from a true value). Therefore, advantageously a security margin will be provided in the sense that the threshold value (i.e. the target BER) used in step S32 is different (lower) than the target BER guaranteed to (requested by) a higher network layer (e.g. an application). The problem may, however, also be overcome by reassigning the modulation scheme of the subcarrier which caused the calculated average BER to exceed the target BER. This subcarrier will be (re-)assigned the next lower constellation. (Re-)assignment of the next lower constellation to this subcarrier is carried out in the optional step S40 of FIG. 4.

When seeing the overall BER of FIG. 6 as the true overall BER (and not as the estimated/calculated overall BER and when neglecting the differences between the calculated and the true overall BER, then FIG. 6 equally applies to the second of the two mutually alternative embodiments.

It is obvious that the proposed algorithms (of the first and the second alternative embodiments) allow an exact adjustment of the overall target BER and are of low computational complexity. While a low BER basically is good, a low BER would be achieved at the expense of a low data rate. The more exact the target BER is achieved, the better is the data rate. Therefore, the proposed algorithms provide a guaranteed BER with a high data rate.

Adjusting the constellation in a way that guarantees the target BER significantly improve the quality of service and provides for a flexible adaption to wanted applications (e.g. video, telephone, data, etc.). It is also very advantageous when an error correction/detection code or other technical scheme requires the BER to remain below a certain target BER. Thus, the (overall) BER calculated may correspond to a BER of the uncoded channel. This corresponds to a position in the signal flow before the FEC decoder 34 and after the symbol demapper 30.

Because the BER of a subcarrier with a lower order modulation scheme has a lower weight in the averaged BER than a subcarrier with a higher order modulation scheme, the BER can be easily "fine tuned" towards the end of the assignment process. Therefore, assigning the higher order modulation schemes first and the lower order modulation schemes later provides for an exact achievement of the target BER with a low computational complexity.

In case of the second alternative, it is obvious that the target BER is achieved for each of the constellation types separately, which is not known in the prior art. However, applying the above argument, that the calculated BER and the true BER is approximately the same, it is immediately seen that this also holds for the first alternative.

It can be seen that in the embodiment the SNR thresholds are adjusted dynamically according to the current SNR distribution over the (complete) multi-carrier symbol (e.g. OFDM symbol), while prior art solutions are using static SNR threshold to select the modulation of the subcarriers.

The proposed adaption of transmission parameters can be performed at several points of time or occasions. For example, it may be performed initially at startup. This is advantageous for static channels (e.g. PLC channels). The adaption may further be performed continuously in background. This is good for varying channel conditions. To achieved this, the adaption mechanism described is repeated. Of course, when the determined link parameters have not changed, they do not have to be transmitted again. Further the true overall BER may be monitored. Hereby, a true BER that is larger than the target BER triggers the adaption mechanism. A true BER that is significantly smaller (e.g. smaller than a threshold value, said threshold value given by the difference of the target BER and a predefined value) than the target BER may also trigger the adaption mechanism.

Although described in detail here only for single-input-single-output (SISO) adaptive system, the present invention is especially applicable also to multiple-input-multiple-output (MIMO) communication systems (e.g. MIMO-OFDM). Such systems may require the assignment of more than one transmission parameter per subcarrier (one parameter for each independent transmission channel. For example, the plurality of constellations for the plurality of subcarriers is called a tonemap (e.g. OFDM tonemap). For each independent transmit path there must be determined one tonemap by the receiver 1-1 and the tonemaps must be transmitted to the transmitter 1-2. Although described here with OFDM as an example, the teaching of the present invention and of the embodiments described herein may also be applied to other multi-carrier schemes including, for example, multi-carrier wavelet modulation.

The invention claimed is:

1. A method of adapting transmission parameters of a group of subcarriers comprising steps of:
    determining a channel quality value for each subcarrier;
    establishing an order of assignment groups, each assignment group comprising one or more subcarriers, based on the channel quality values;
    assigning, in the order of the assignment groups, a transmission parameter to every assignment group, whereby assigning a transmission parameter to an assignment group comprises assigning the transmission parameter to all subcarriers of the assignment group; and
    calculating a link performance value based on previously assigned one or more transmission parameters, whereby the step of assigning a transmission parameter to every assignment group is based on a comparison between the calculated link performance value and a link performance target value.

2. A method according to claim 1, wherein the step of calculating the link performance value is executed once between every two consecutive assignments of a transmission parameter to an assignment group.

3. A method according to claim 1, wherein, in case the calculated link performance value is above a link performance target value, the assignment group which is to be assigned next is assigned a transmission parameter which effects a lower link performance value than the transmission parameter assigned to the assignment group which has been assigned before.

4. A method according to claim 3, wherein, in case the calculated link performance value is above the link performance target value, the assignment group which has been assigned before is reassigned a transmission parameter, the reassigned transmission parameter being the transmission parameter assigned to the assignment group which is assigned next.

5. A method according to claim 3 or 4, wherein,
    the assigned transmission parameters are elements of a predefined ordered set, whereby a transmission parameter causing a higher link performance value is ordered before a transmission parameter causing a lower link performance value, and
    the transmission parameter which is assigned to the assignment group which is to be assigned next is the transmission parameter which is the next in order from the transmission parameter which has been assigned before.

6. A method according to claim 3 or 4, wherein, in case the calculated link performance value is below the link performance target value, the assignment group which is assigned next is assigned the same transmission parameter as the transmission parameter which has been assigned before.

7. A method according to claim 1, wherein the step of calculating a link performance value based on previously assigned one or more transmission parameters comprises steps of:
- calculating a subcarrier specific link performance value for each of the one or more previously assigned transmission parameters; and
- averaging the calculated subcarrier specific link performance values to obtain the link performance value.

8. A method according to claim 1, wherein said one or more subcarriers are all subcarriers having previously assigned a transmission parameter or are all subcarriers having lastly been assigned the same transmission parameter.

9. A method according to claim 1, wherein the channel quality values correspond to, are or are based on signal-to-noise ratios.

10. A method according to claim 1, wherein the transmission parameters are modulation orders or modulation schemes.

11. A method according to claim 1, wherein the link performance value corresponds to, is or is based on a bit error rate.

12. A non-transitory computer program product having instructions stored therein that when executed by at least one processing device implements a method of adapting transmission parameters of a group of subcarriers, the method comprising:
- determining a channel quality value for each subcarrier;
- establishing an order of assignment groups, each assignment group comprising one or more subcarriers, based on the channel quality values;
- assigning, in the order of the assignment groups, a transmission parameter to every assignment group, whereby assigning a transmission parameter to an assignment group comprises assigning the transmission parameter to all subcarriers of the assignment group; and
- calculating a link performance value based on previously assigned one or more transmission parameters, whereby the step of assigning a transmission parameter to every assignment group is based on a comparison between the calculated link performance value and a link performance target value.

13. A communication device comprising:
- a channel estimator for determining a channel quality value for each subcarrier of a group of subcarriers; and a controller adapted to:
- establish an order of assignment groups, each assignment group comprising one or more subcarriers, based on the channel quality values;
- assign, in the order of the assignment groups, a transmission parameter to every assignment group, whereby assigning a transmission parameter to an assignment group comprises assigning the transmission parameter to each subcarrier of the assignment group;
- calculate a link performance value based on previously assigned one or more transmission parameter, whereby said assignment of a transmission parameter to every assignment group is based on a comparison between the calculated link performance value and a link performance target value.

14. A communication device according to claim 13, wherein the controller is adapted to calculate said link performance value between every two consecutive assignments of a transmission parameter to a transmission group.

15. A communication device according to claim 13, wherein, in case the calculated link performance value is above a link performance target value, the assignment group which is to be assigned next is assigned a transmission parameter which effects a lower link performance value than the transmission parameter assigned to the assignment group which has been assigned before.

16. A communication device according to claim 15, wherein, in case the calculated link performance value is above the link performance target value, the controller is adapted to reassign a transmission parameter to the assignment group which has been assigned before, the reassigned transmission parameter being the transmission parameter assigned to the assignment group which is assigned next.

17. A communication device according to claim 15 or 16, wherein, the assigned transmission parameters are elements of a predefined ordered set, whereby a transmission parameter causing a higher link performance value is ordered before a transmission parameter causing a lower link performance value, and the transmission parameter which is assigned to the assignment group which is to be assigned next is the transmission parameter which is the next in order from the transmission parameter which has been assigned before.

18. A communication device according to claim 15 or 16, wherein, in case the calculated link performance value is below the link performance target value, the controller is adapted to assign to the assignment group which is assigned next the same transmission parameter as the transmission parameter which has been assigned before.

19. A communication device according to claim 13, wherein the controller is adapted to calculate said link performance value by:
- calculating a subcarrier specific link performance value for each of the one or more previously assigned transmission parameters; and
- averaging the calculated subcarrier specific link performance values to obtain the link performance value.

20. A communication device according to claim 13, wherein said one or more subcarriers are all subcarriers having previously assigned a transmission parameter or are all subcarriers having lastly been assigned the same transmission parameter.

21. A communication device according to claim 13, wherein the channel quality values correspond to, are or are based on signal-to-noise ratios.

22. A communication device according to claim 13, wherein the transmission parameters are modulation orders or modulation schemes.

23. A communication device according to claim 14, wherein the link performance value corresponds to, is or is based on a bit error rate.

* * * * *